US009139212B2

(12) United States Patent
Nobles

(10) Patent No.: US 9,139,212 B2
(45) Date of Patent: Sep. 22, 2015

(54) POLE CARRYING DEVICE AND METHOD

(71) Applicant: Wahoo Innovations, Inc., Farmville, NC (US)

(72) Inventor: Robert Lee Nobles, Farmville, NC (US)

(73) Assignee: Wahoo Innovations, Inc., Farmville, NC (US)

( * ) Notice: Subject to any disclaimer, the term of this patent is extended or adjusted under 35 U.S.C. 154(b) by 0 days.

(21) Appl. No.: 14/177,940

(22) Filed: Feb. 11, 2014

(65) Prior Publication Data
US 2014/0227074 A1 Aug. 14, 2014

Related U.S. Application Data

(60) Provisional application No. 61/764,067, filed on Feb. 13, 2013.

(51) Int. Cl.
*B62B 1/00* (2006.01)
*B62B 1/26* (2006.01)
*B62B 3/10* (2006.01)
*B62B 1/14* (2006.01)
*B62B 3/04* (2006.01)
*B62B 3/12* (2006.01)

(52) U.S. Cl.
CPC ............... *B62B 1/262* (2013.01); *B62B 1/008* (2013.01); *B62B 1/14* (2013.01); *B62B 3/04* (2013.01); *B62B 3/102* (2013.01); *B62B 3/12* (2013.01)

(58) Field of Classification Search
CPC ............... B62B 1/00; B62B 1/20; B62B 5/00
USPC .............. 280/79.11, 47.34, 47.35, 79.3, 79.7, 280/47.19, 47.3, 652, 30, 641, 47.24, 40
See application file for complete search history.

(56) References Cited

U.S. PATENT DOCUMENTS

| | | | | |
|---|---|---|---|---|
| 2,636,745 | A | * | 4/1953 | Cartwright ................. 280/43.18 |
| 3,731,947 | A | * | 5/1973 | Fontaine ....................... 280/641 |
| 4,214,774 | A | * | 7/1980 | Kluge ........................... 280/652 |
| 4,570,960 | A | * | 2/1986 | Peetz ...................... 280/47.131 |
| 4,712,803 | A | | 12/1987 | Garcia |
| 5,037,118 | A | * | 8/1991 | Straube ........................ 280/79.6 |
| 5,116,068 | A | * | 5/1992 | Declouette ................. 280/47.24 |
| 5,181,731 | A | | 1/1993 | Gustavsen |
| 5,586,778 | A | * | 12/1996 | Lindh et al. ..................... 280/40 |
| 5,727,799 | A | * | 3/1998 | DiSario ........................ 280/47.3 |
| 6,109,644 | A | * | 8/2000 | Cox .............................. 280/652 |

(Continued)

FOREIGN PATENT DOCUMENTS

GB 2418399 A 3/2006
RU 1802803 A3 3/1993

*Primary Examiner* — Hau Phan
(74) *Attorney, Agent, or Firm* — E. Eric Mills; Nexsen Pruet, PLLC

(57) ABSTRACT

A pole carrying device and method of using the pole carrying device is disclosed, wherein the pole carrying device is designed to carry and maneuver poles or pipes in a safe and easily controlled manner. In one example, the pole carrying device comprises a main beam that is supported by a wheel assembly, wherein the wheel assembly comprises two wheels. Further, two cradles are mounted atop the main beam (e.g., one at each end) for holding the poles or pipes. The method of using the pole carrying device includes, but is not limited to, the steps of providing the pole carrying device in an at rest position, placing the poles or pipes atop the pole carrying device, and rolling the pole carrying device along the ground and thereby transporting the poles or pipes.

19 Claims, 11 Drawing Sheets

(56) References Cited

U.S. PATENT DOCUMENTS

| | | | |
|---|---|---|---|
| 6,116,533 A * | 9/2000 | Elder | 280/47.35 |
| 6,182,920 B1 * | 2/2001 | Watkins | 242/594.4 |
| 6,270,094 B1 * | 8/2001 | Campbell | 280/47.19 |
| 6,322,061 B1 * | 11/2001 | Maser et al. | 269/17 |
| 6,419,245 B1 * | 7/2002 | Trimble | 280/79.11 |
| 6,523,776 B1 * | 2/2003 | Elder | 280/47.35 |
| 6,575,483 B1 * | 6/2003 | Davis | 280/63 |
| 6,896,273 B2 * | 5/2005 | Forsberg et al. | 280/79.11 |
| 7,017,940 B2 * | 3/2006 | Hatfull | 280/652 |
| 7,083,174 B2 * | 8/2006 | Kane | 280/47.2 |
| 7,419,170 B2 * | 9/2008 | Krizan et al. | 280/79.7 |
| 7,448,632 B1 * | 11/2008 | Nieto | 280/47.24 |
| 8,465,031 B2 * | 6/2013 | Coghill, Jr. | 280/79.3 |
| 2004/0080128 A1 * | 4/2004 | Lindsey et al. | 280/30 |
| 2005/0012308 A1 * | 1/2005 | Swanner | 280/652 |
| 2005/0275175 A1 | 12/2005 | Murphy et al. | |
| 2007/0194560 A1 * | 8/2007 | Zink | 280/652 |

\* cited by examiner

POLE CARRYING DEVICE AND METHOD

CROSS REFERENCE TO RELATED APPLICATIONS

This application is related to and claims priority to U.S. Provisional Patent Application Ser. No. 61/764,067, filed Feb. 13, 2013. The disclosure of the referenced Provisional Application is specifically incorporated by reference herein.

TECHNICAL FIELD

The presently disclosed subject matter relates generally to devices and methods for transporting poles or pipes and more particularly to a pole carrying device and method.

BACKGROUND

Poles, pipes, and tubes are used in a variety of applications. For example, poles are used to support a variety of equipment or devices, such as to mount light fixtures in an elevated position. Further, pipes and tubes are used to convey liquids and/or gases. Larger poles and pipes are heavy and difficult to transport and maneuver at, for example, a construction site. Consequently, workers expend much time and energy handling and/or moving such poles and/or pipes, sometimes needing heavy equipment.

SUMMARY

In one exemplary aspect, the invention relates to a device for carrying and maneuvering poles or pipes, the device comprising a main beam operably associated with at least two wheels, a cradle on each end of the main beam, one or more fastening mechanisms to secure a pole or pipe to the main beam, and at least one kickstand operably associated with the mean beam. The cradles may include a protective coating. The device may further include additional cradles disposed along the length of the main beam. The cradle on each end of the main beam may be adjustable to accommodate the one or more poles. The fastening mechanisms may be a strap and the fastening mechanisms may be provided at each cradle. The kickstand may be removable or may be foldable and configured to be secured to the device in a folded position. The wheels may be inflatable tires. In some embodiments, the device may include a three or more wheels and the at least one kickstand may include a third wheel. The third wheel may be a swivel wheel.

In another exemplary aspect, the invention relates to a method of carrying or maneuvering a pole using a pole carrying device, the method comprising providing a pole carrying device comprising a main beam operably associated with at least two wheels, a cradle on each end of the main beam, one or more fastening mechanisms to secure one or more poles to the main beam, and at least one kickstand operably associated with the main beam. The method further comprises placing the device at rest with the kickstand in contact with the ground, placing one or more poles on the pole carrying device and securing the pole to the device with one or more fastening mechanisms, grasping at least one end of the one or more poles and tilting the one or more poles and pole carrying device such that the kickstand is no longer in contact with the ground, thereby rendering the pole carrying device free to move, pushing or pulling the one or more poles on the pole carrying device thereby causing the pole carrying device to move along the ground, maneuvering the one or more poles and pole carrying device to a desired destination and, upon arrival, placing the pole carrying device at rest with kickstand in contact with the ground, loosening or removing the one or more fastening mechanisms, and removing the one or more poles from the pole carrying device. Rather than one or more poles, the device may also be used to transport one or more pipes, canisters, or other type of elongated cylindrical or rectangular objects.

BRIEF DESCRIPTION OF THE DRAWINGS

Figure 1:
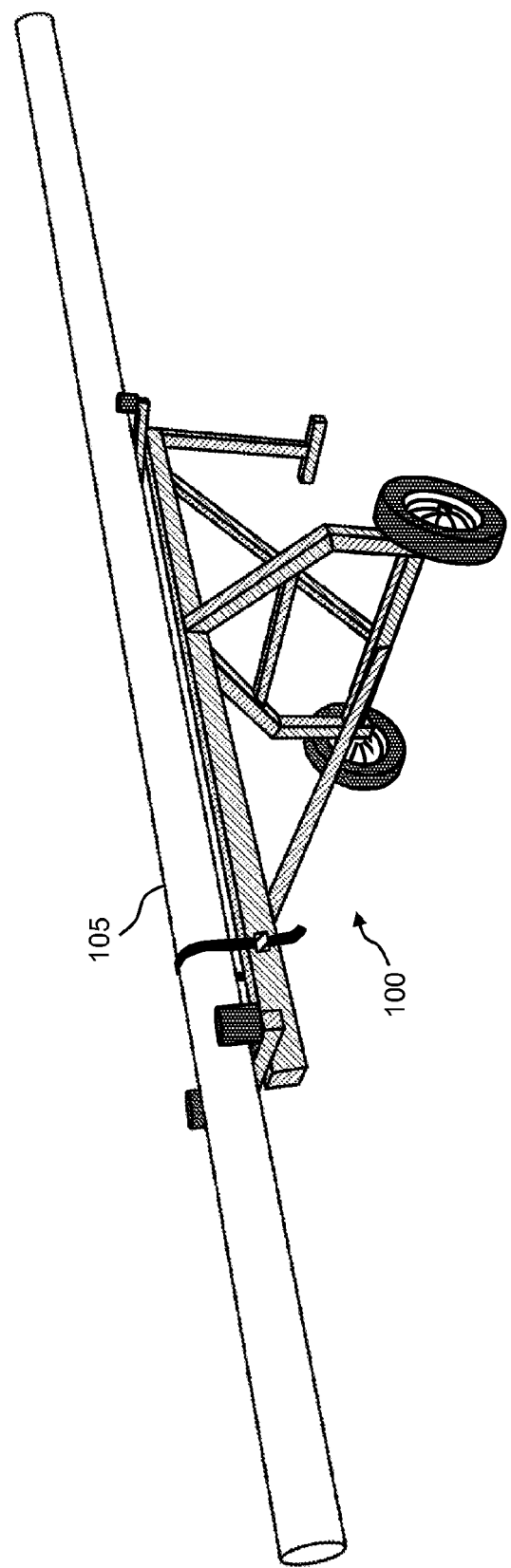
Figure 2:
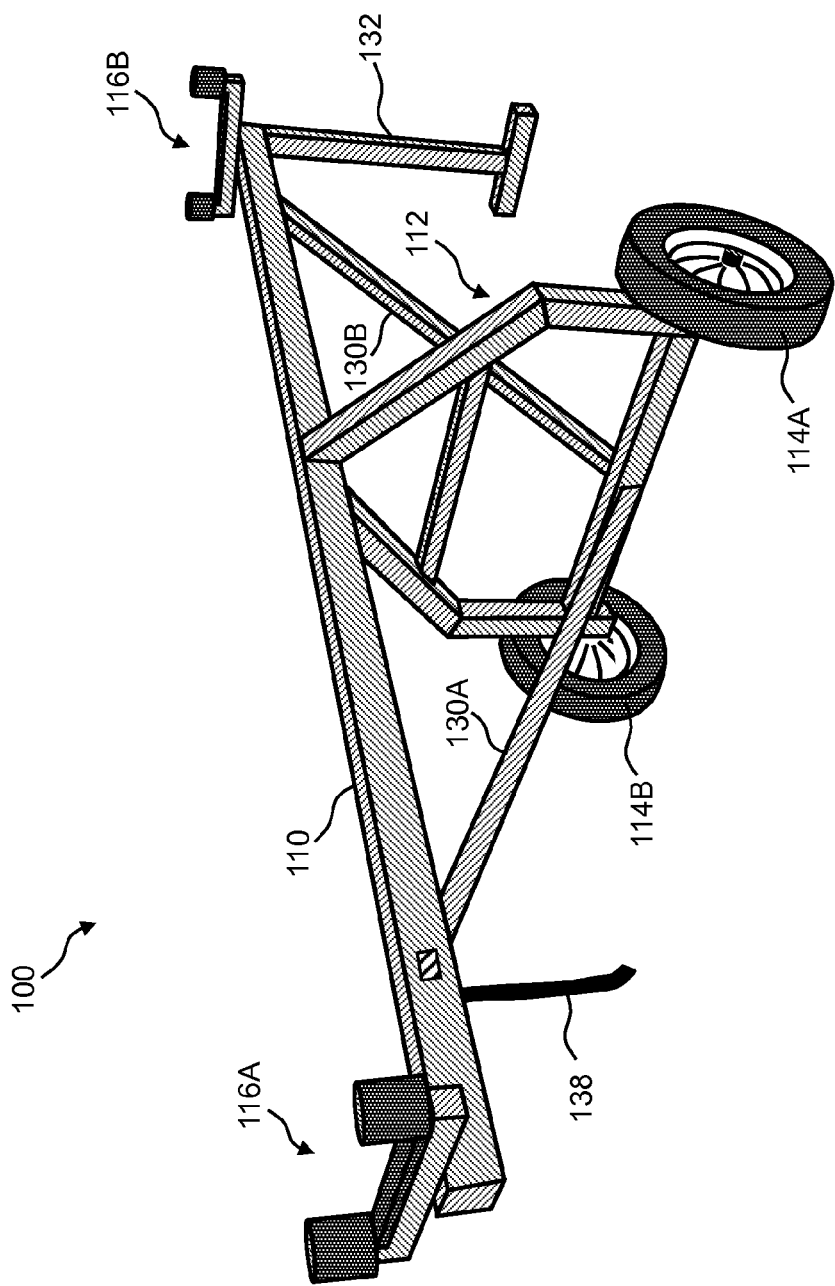
Figure 3:
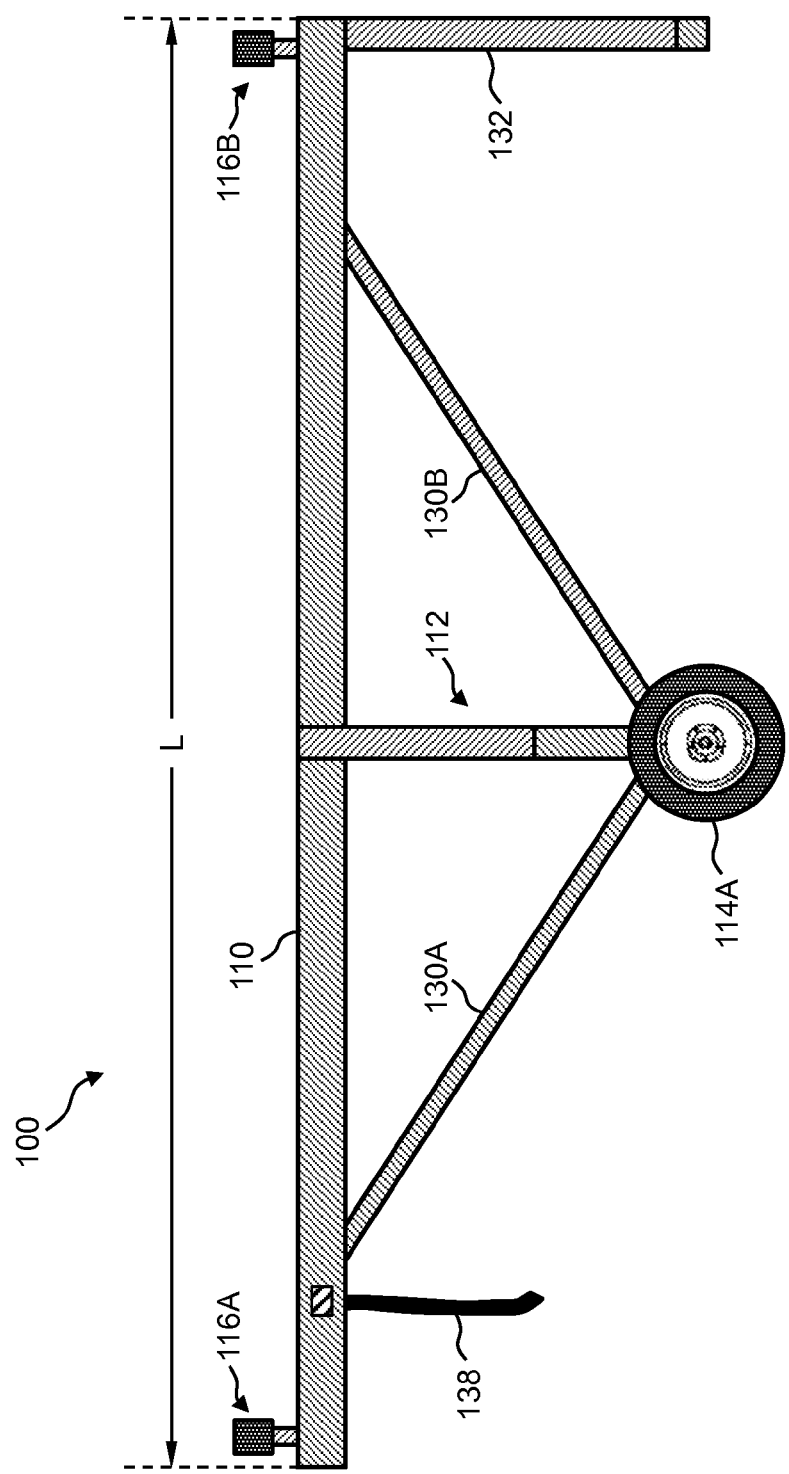
Figure 4:
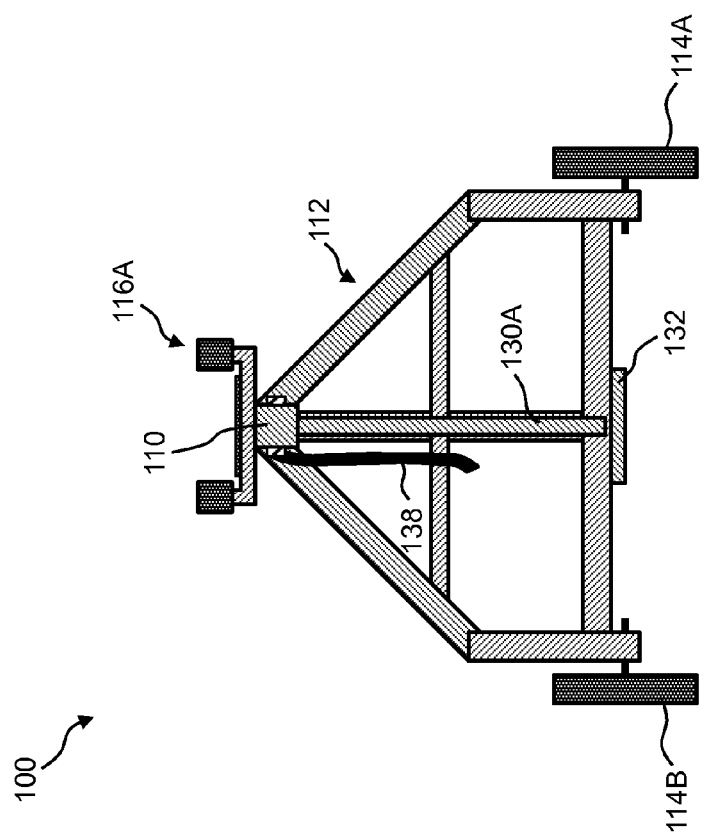
Figure 5:
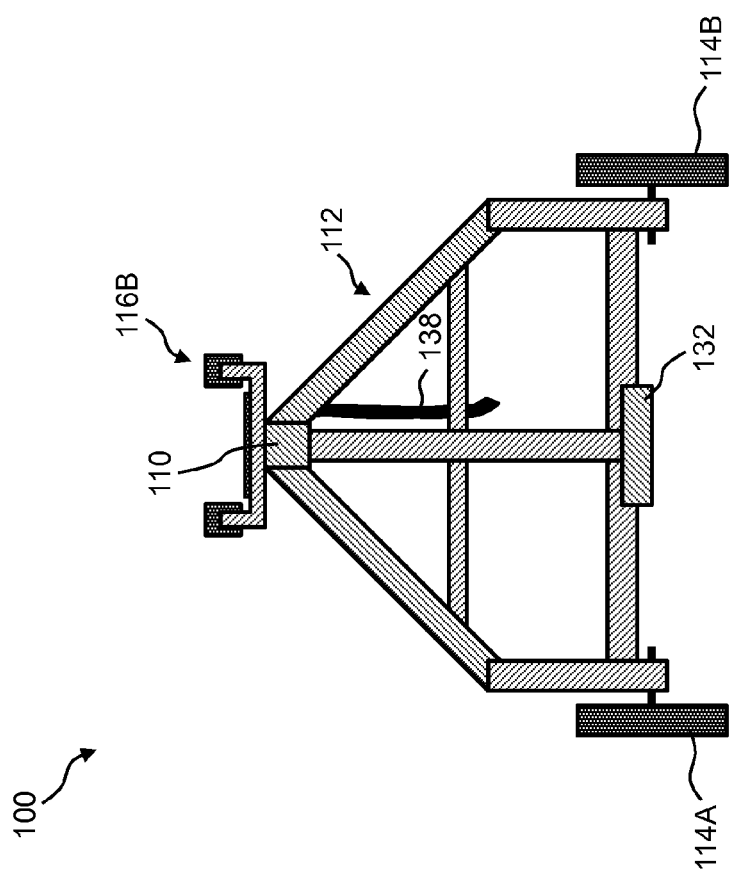
Figure 6:
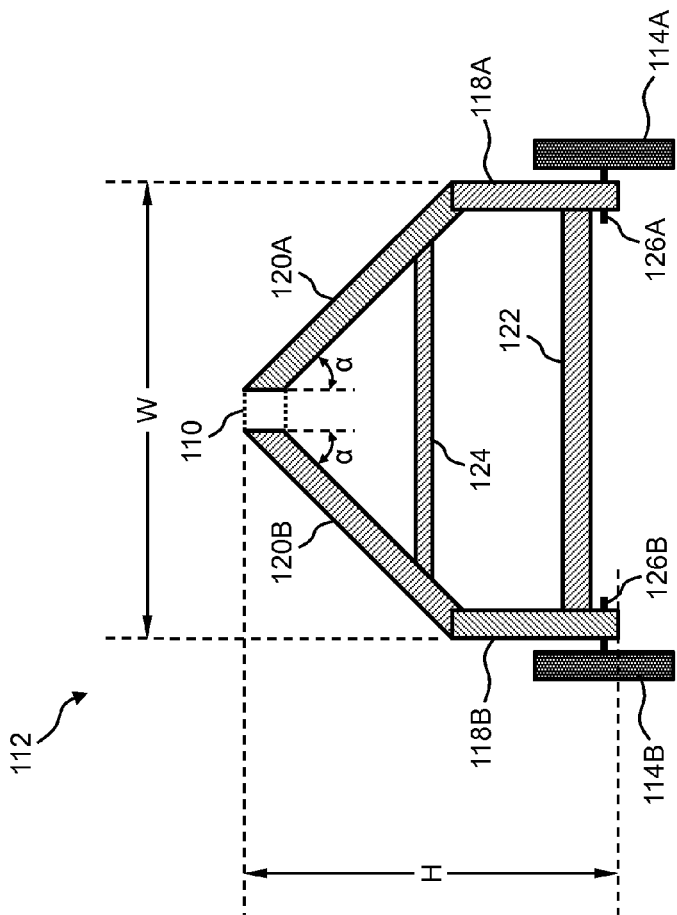
Figure 7:
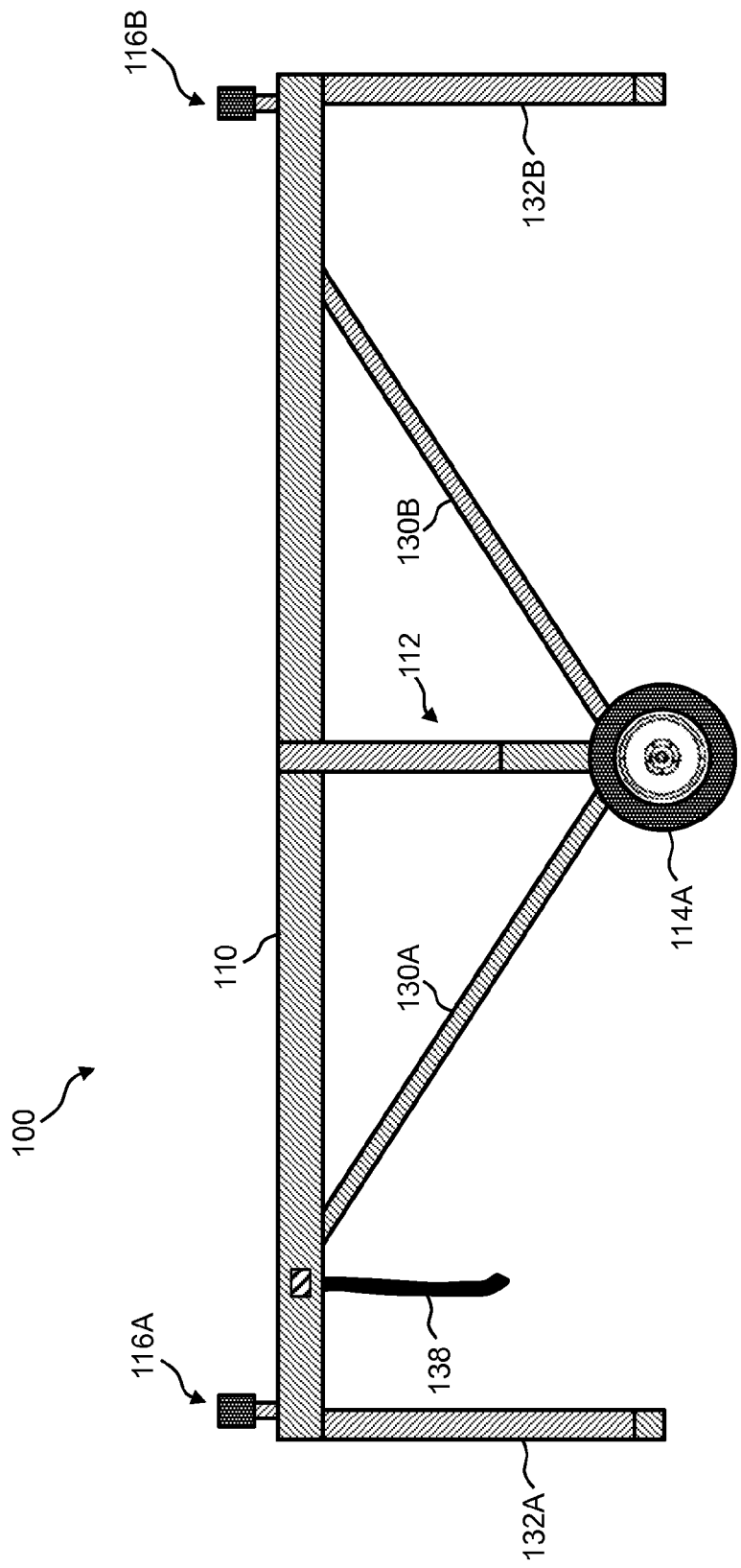
Figure 8:
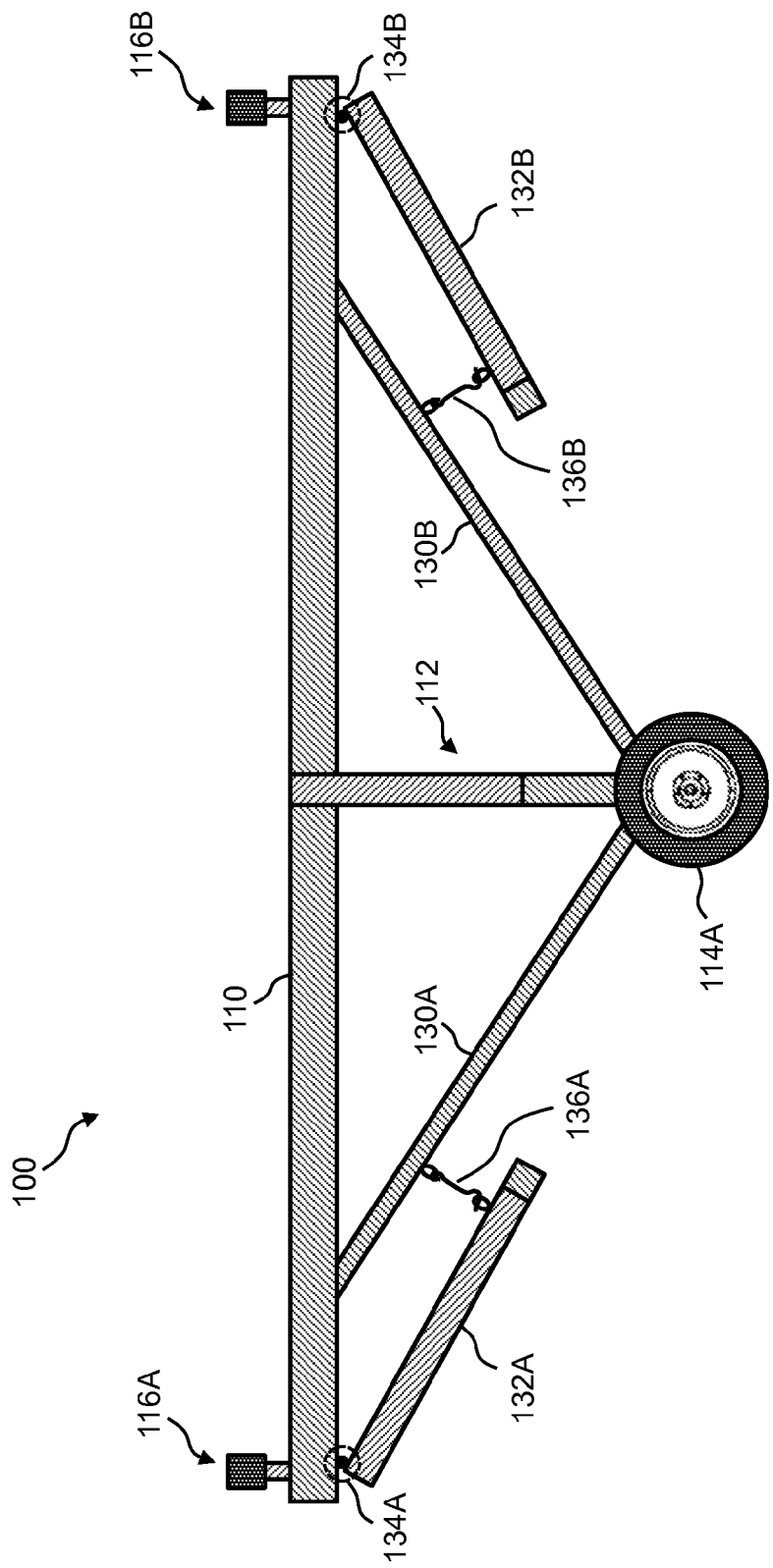
Figure 9A:
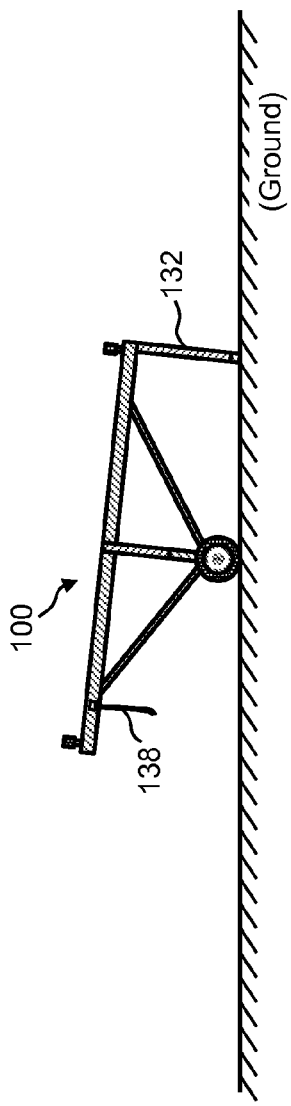
Figure 9B:
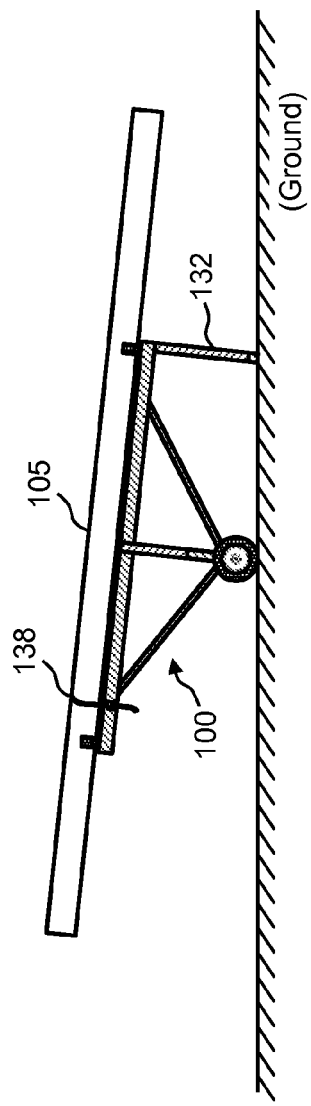
Figure 9C:
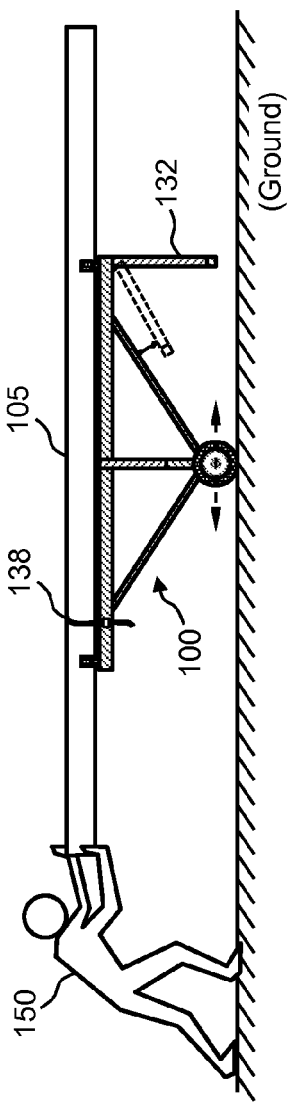
Figure 10:
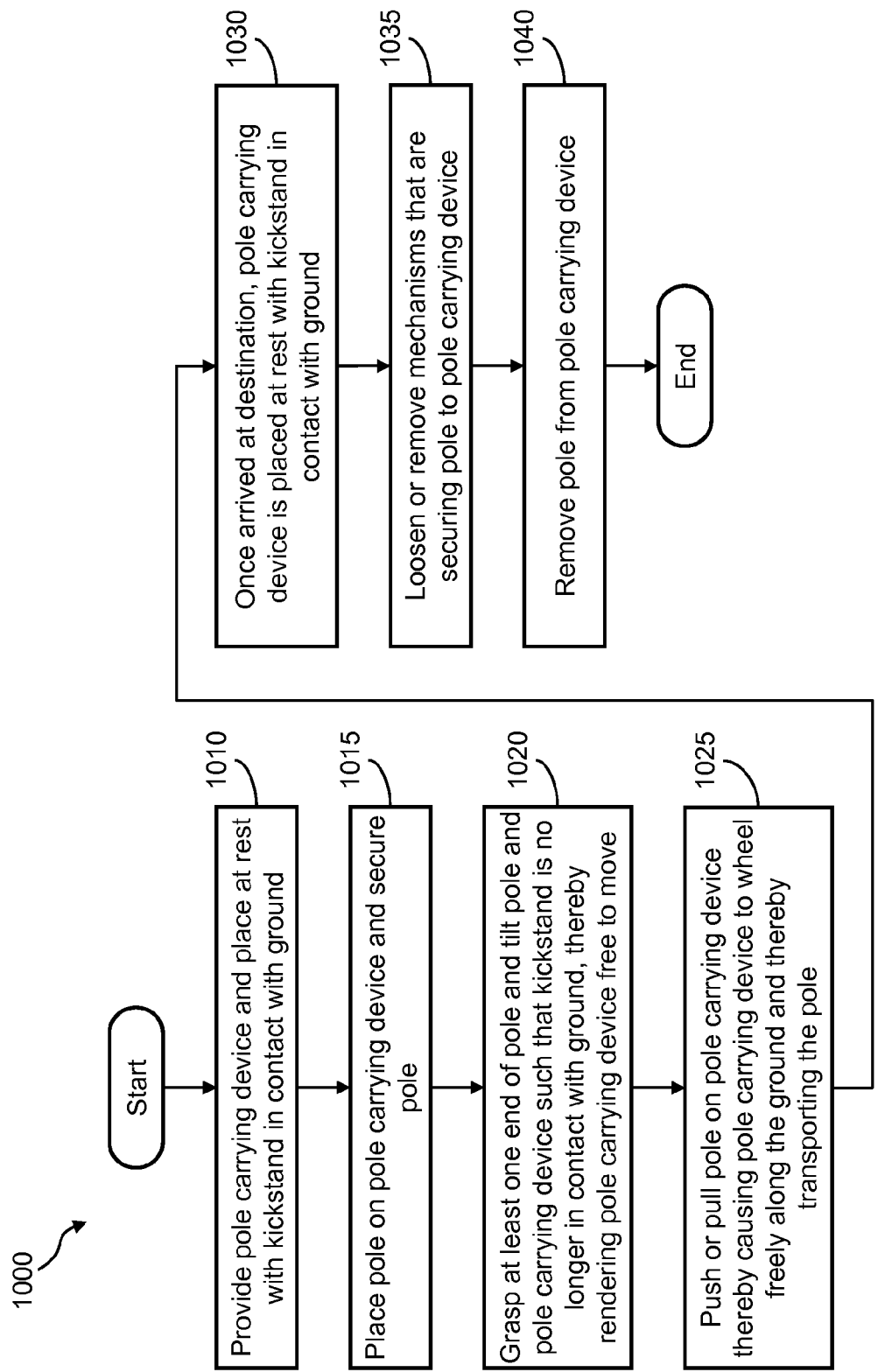
Figure 11:
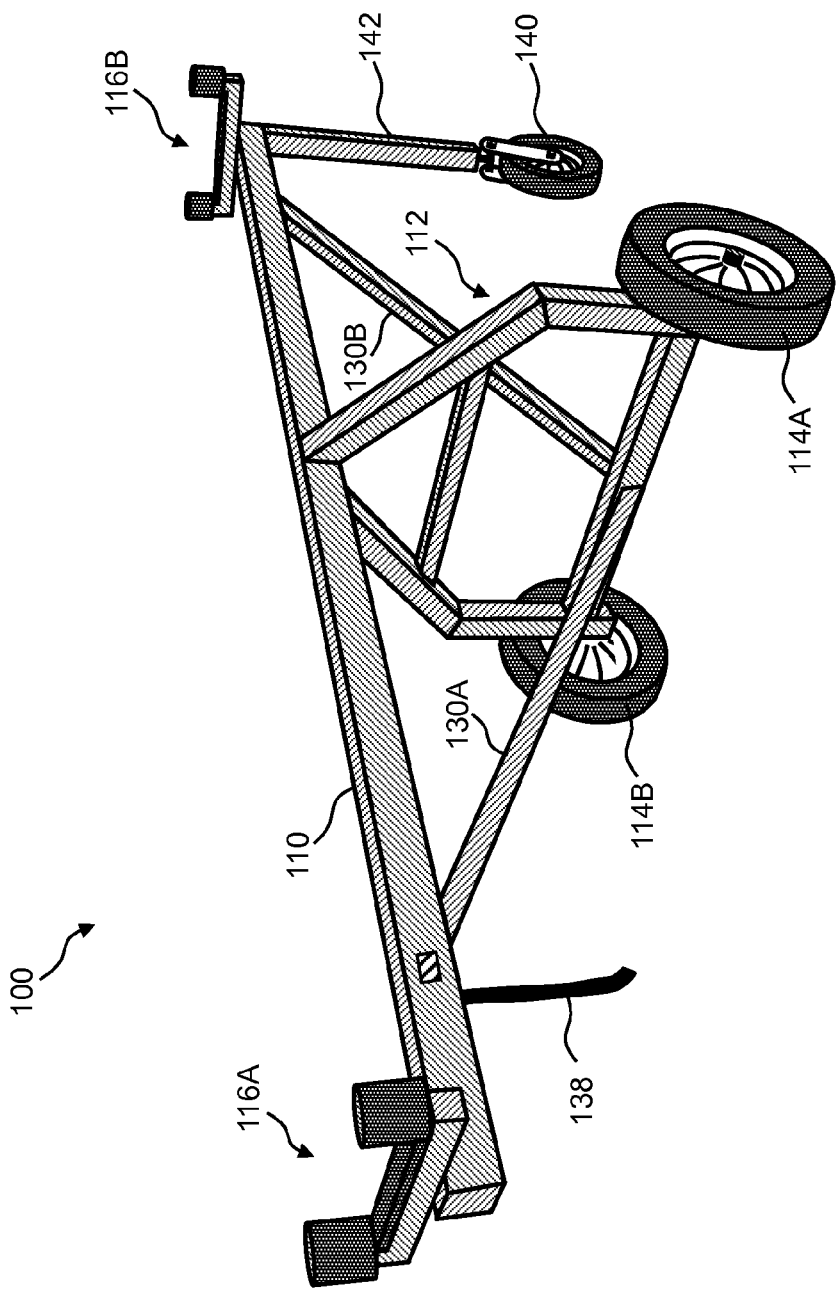

Having thus described the presently disclosed subject matter in general terms, reference will now be made to the accompanying Drawings, which are not necessarily drawn to scale, and wherein:

FIG. 1 illustrates a perspective view of an example of the presently disclosed pole carrying device while holding a pole;

FIG. 2 illustrates a perspective view of the presently disclosed pole carrying device absent the pole;

FIG. 3 shows a side view of the presently disclosed pole carrying device;

FIG. 4 and FIG. 5 shows end views of the presently disclosed pole carrying device;

FIG. 6 shows a plan view of an example of a wheel assembly of the presently disclosed pole carrying device;

FIG. 7 shows a side view of an embodiment of the pole carrying device that includes two kickstands;

FIG. 8 shows a side view of an embodiment of the pole carrying device that includes hinged kickstands;

FIG. 9A, FIG. 9B, and FIG. 9C show side views of the presently disclosed pole carrying device and process of using the pole carrying device;

FIG. 10 illustrates a flow diagram of an example of a method of using the presently disclosed pole carrying device; and FIG. 11 illustrates a perspective view of another example of the presently disclosed pole carrying device, wherein the pole carrying device includes a third wheel.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a pole carrying device and method, wherein the pole carrying device is designed to carry and maneuver poles, pipes, or related items in a safe and easily controlled manner.

An aspect of the presently disclosed pole carrying device is that it provides a mechanism by which poles and/or pipes can be safely and easily transported. For example, the pole carrying device can be used at a construction site or the like to safely and easily transport poles or pipes.

Another aspect of the presently disclosed pole carrying device is that it provides a mechanism by which poles and/or pipes can be held at rest without overturning.

While the presently disclosed pole carrying device is described hereinbelow with reference to carrying poles and/or pipes, the pole carrying device is not limited to carrying poles and/or pipes only. The pole carrying device may be used to carry any elongated article that can be handled by the users thereof. For example, the presently disclosed pole carrying device may be used to carry wooden timber or cylindrical air canisters.

FIG. 1 illustrates a perspective view of an example of the presently disclosed pole carrying device 100 while holding a pole 105. The pole carrying device 100 comprises, for example, a lightweight two-wheel design. The pole carrying device 100 can carry one or more poles 105. The pole 105 can be any type and size of pole or pipe and can be any type of elongated material. Examples of types of poles or pipes include, but are not limited to, light poles, utility poles, flag poles, sailing masts, irrigation pipes, electrical conduit, sewer pipes, water pipes, oil pipes, natural gas pipes, and the like; which may be formed, for example, of aluminum, steel, stainless steel, plastic (e.g., polyvinyl chloride (PVC) plastic), wood (in the case of poles), and the like.

The pole 105 can be secured atop the pole carrying device 100 by any means, such as by one or more straps. The pole carrying device 100 is easy to maneuver. For example, the pole carrying device 100 can be maneuvered by hand by one or two workers at a construction site. Further, the pole carrying device 100 is designed to hold poles and/or pipes at rest without overturning. More details of the presently disclosed pole carrying device 100 are shown and described herein below with reference to FIG. 2 through FIG. 11.

FIG. 2 illustrates a perspective view of the presently disclosed pole carrying device 100 absent the pole 105. Additional views of the presently disclosed pole carrying device 100 are shown in FIG. 3, FIG. 4, and FIG. 5. Namely, FIG. 3 shows a side view of the pole carrying device 100, FIG. 4 shows an end view of one end of the pole carrying device 100, and FIG. 5 shows an end view of the other end of the pole carrying device 100.

The pole carrying device 100 comprises a main beam 110 that is supported by a wheel assembly 112, wherein the wheel assembly 112 comprises two wheels 114 (e.g., wheels 114A, 114B). Two cradles 116 are mounted atop the main beam 110 for holding the pole 105. For example, a cradle 116A is at one end of the main beam 110 and a cradle 116B is at the opposite end of the main beam 110. The cradles 116A, 116B may be, for example, U-shaped members, wherein the pole 105 can be retained between the sides of the U-shaped members. In this way, the pole 105 is held atop the pole carrying device 100 without rolling off. The cradles 116A, 116B can be removable from the main beam 110 and can be adjustable so you can make the cradle wider if needed to accommodate the amount of load. Optionally, the surfaces of the cradles 116A, 116B can have a protective covering to prevent damage to the pole 105. For example, the cradles 116A, 116B can be padded with rubber or plastic.

The pole carrying device 100 also typically comprises two supports 130 (e.g., supports 130A, 130B) for holding the wheel assembly 112 substantially orthogonal to the main beam 110. For example, the wheel assembly 112 is positioned at about the midway point of the main beam 110. The support 130A is arranged at an angle between one side of the wheel assembly 112 and the underside of one end of the main beam 110, while the support 130B is arranged at an angle between the other side of the wheel assembly 112 and the underside of the other end of the main beam 110. Further, a kickstand 132 can be provided at one end of the pole carrying device 100. For example, the kickstand 132 is mechanically coupled to one end of the main beam 110. In the example shown in FIG. 2, the kickstand 132 is a fixed-position kickstand, although it can also be foldable. The kickstand 132 can also be telescoping to make the kickstand longer or shorter. Examples of using the kickstand 132 are shown with reference to FIG. 9A, FIG. 9B, and FIG. 9C.

The pole carrying device 100 also typically comprises at least one fastening mechanism 138, wherein the fastening mechanism 138 is used to secure the pole 105 atop the cradles 116A, 116B. Namely, the fastening mechanism 138 is used to prevent the pole 105 from falling or bouncing out of the cradles 116A, 116B when the pole carrying device 100 is in use. One or more fastening mechanisms 138 can be located anywhere along the length of the main beam 110, including at one or both of the cradles 116. In one example, FIG. 2 shows one fastening mechanism 138 near one end of the main beam 110. In another example, a first fastening mechanism 138 is provided at the cradle 116A and a second fastening mechanism 138 is provided at the cradle 116B.

The fastening mechanism 138 can be, for example, a strap, a rope, a cord, a tie, a harness, a bungee cord, and the like. By way of example, FIG. 2 shows the fastening mechanism 138 implemented using a strap, wherein one end of the strap is permanently affixed to one side of the main beam 110. After wrapping around the pole 105 (see FIG. 1), the other end of the strap can be adjustably secured to the other side of the main beam 110. For example, buckles, clamps, hooks, knots, Velcro®, and the like can be associated with the strap for holding it tight around the pole 105. In another example, a first strap is provided at the cradle 116A and a second strap is provided at the cradle 116B.

Referring now to FIG. 6, a plan view of an example of the wheel assembly 112 of the presently disclosed pole carrying device 100 is shown. In this example, the wheel assembly 112 comprises two vertical members 118 (e.g., vertical members 118A, 118B) that are coupled to two respective angled members 120 (e.g., angled members 120A, 120B). More specifically, the wheel 114A is rotatably coupled to the lower end of the vertical member 118A via an axel 126A, while the upper end of the vertical member 118A is coupled to the lower end of the angled member 120A. The upper end of the angled member 120A is coupled to the main beam 110. In one example, the upper end of the angled member 120A is coupled to one side of the main beam 110. In like manner, the wheel 114B is rotatably coupled to the lower end of the vertical member 118B via an axel 126B, while the upper end of the vertical member 118B is coupled to the lower end of the angled member 120B. The upper end of the angled member 120B is coupled to the main beam 110. In one example, the upper end of the angled member 120B is coupled to the other side of the main beam 110. Further, a crossbar 122 is optionally provided between vertical members 118A, 118B and a crossbar 124 is optionally provided between angled members 120A, 120B. The angled members 120A, 120B are set at an angle α with respect to the sides of the main beam 110. The angle α can be from about 30 degrees to about 90 degrees in one example, or is about 45 degrees in another example.

The wheels 114A, 114B can be any types of wheels commonly used, for example, on utility carts or small utility trailers as long as they are sized to handle the expected load and are durable enough to handle the environment in which the pole carrying device 100 is used. In some embodiments, the wheels 114A and 114B include inflatable tires. In one example, the wheels 114A and 114B use 14-inch tires.

The presently disclosed pole carrying device 100 is not limited to one kickstand only. For example, FIG. 7 shows an example of the pole carrying device 100 that includes two kickstands 132. Namely, a kickstand 132A at one end of the main beam 110 and a kickstand 132B at the other end of the main beam 110. The kickstand 132 on one or both ends of the main beam 110 allows the pole carrying device 100 to rest on the ground without overturning.

Further, the presently disclosed pole carrying device 100 is not limited to fixed-position kickstands only. The pole carrying device 100 can include one or two hinged kickstands 132. For example, FIG. 8 shows an example of the pole carrying device 100 that includes two hinged kickstands 132 (e.g., kickstands 132A, 132B), which are foldable. In this example, a hinge 134A is provided between the kickstand 132A and the main beam 110, such that the kickstand 132A can be folded toward the support 130A. Similarly, a hinge 134B is provided between the kickstand 132B and the main beam 110, such that the kickstand 132B can be folded toward the support 130B. Further, fastening mechanisms 136 may be provided for holding the kickstands 132A and 132B in the folded position while the pole carrying device 100 is being rolled along the ground. For example, a fastening mechanism 136A is provided for holding the kickstand 132A in a folded position against the support 130A. Similarly, a fastening mechanism 136B is provided for holding the kickstand 132B in a folded position against the support 130B. In one example, the fastening mechanisms 136 are simple hook and eye mechanisms. However, any fastening mechanism can be used, such as a strap, a tie, a clasp, or a bungee cord. When not folded, each hinge 134 may include a locking mechanism (not shown) to ensure that the kickstand 132 does not collapse inward while supporting the pole carrying device 100 when at rest. In yet another example of the pole carrying device 100, the one or more kickstands 132 can be removable. In an additional example of the pole carrying device 100, the one or more kickstands 132 are telescoping in order to make the kickstand longer or shorter.

Referring now to FIG. 1 through FIG. 8, the main beam 110 and thus the pole carrying device 100 has a length L (see FIG. 3). Further, the wheel assembly 112, when coupled to the main beam 110, has a height H, giving the pole carrying device 100 a height H (see FIG. 6). The wheel assembly 112 has a width W, giving the pole carrying device 100 a width W, not including the wheels 114 (see FIG. 6). The overall height of the pole carrying device 100 is the height H plus about the radius of the wheels 114. Accordingly, the overall height of the pole carrying device 100 can vary slightly as the size of the wheels 114 can vary. The length of the kickstand 132 is less than the overall height of the pole carrying device 100. For example, the length of the kickstand 132 can be set so that the lower end of the kickstand 132 can be from about 4 inches to about 10 inches off of the ground when the pole carrying device 100 is tilted to horizontal and moving (see FIG. 9C). In one more specific example, the length of the kickstand 132 is set so that the lower end of the kickstand 132 is about 6 inches off of the ground when the pole carrying device 100 is tilted to horizontal and moving.

The length L of the main beam 110 can be, for example, from about 6 feet to about 12 feet, or is about 9 feet in another example. The height H of the wheel assembly 112 can be from about 12 inches to about 50 inches in one example, or is about 36 inches in another example. The width W of the wheel assembly 112 can be from about 12 inches to about 50 inches in one example, or is about 36 inches in another example.

When the width W of the wheel assembly 112 is about 36 inches, then the spacing of the wheels 114A, 114B is about 40 inches.

The structural members forming the pole carrying device 100 can be, for example, square tubing (i.e., hollow tubing with square cross-section), rectangular tubing (i.e., hollow tubing with rectangular cross-section), piping (i.e., hollow piping with circular cross-section), I-beams, structural channels, angle members, and any combinations thereof. The structural members forming the pole carrying device 100 can be formed, for example, of aluminum, steel, stainless steel, PVC plastic, and any combinations thereof. The various structural members forming the pole carrying device 100 can have the same or different cross-sectional dimensions and the same or different cross-sectional shapes, and can comprise the same or different gauge metal.

In one example, the pole carrying device 100 is formed entirely of aluminum square tubing, wherein the aluminum members are mechanically coupled via, for example, welding. In this example, the main beam 110 can be, for example, 4×4-inch, ¼ inch thick square tubing; the vertical members 118, the angled members 120, the crossbar 122, and the kickstand(s) 132 can be, for example, 3×3-inch, ¼ inch thick square tubing; the supports 130 and the crossbar 124 can be, for example, 2×2-inch, ¼ inch thick square tubing; and the cradles 116 can be, for example, 1.5×1.5-inch, ¼ inch thick square tubing.

Referring now to FIG. 9A, FIG. 9B, and FIG. 9C are side views of the presently disclosed pole carrying device 100, which show a process of using the pole carrying device 100. Namely, FIG. 9A shows the pole carrying device 100 at rest, but not yet loaded with the pole 105. FIG. 9B shows the pole carrying device 100 at rest and loaded with the pole 105, wherein the fastening mechanism 138 is a strap that is secured around the pole 105. FIG. 9C shows a user 150 pushing the loaded pole carrying device 100 so that it moves along the ground via the wheels 114, and wherein the pole carrying device 100 is being used to transport the pole 105. More details of using the presently disclosed pole carrying device 100 are described herein below with reference to FIG. 10.

FIG. 10 illustrates a flow diagram of an example of a method 1000 of using the presently disclosed pole carrying device 100. Using the method 1000, a pole or pipe can be maneuvered on the pole carrying device 100 in a safe and easily controlled manner. The method 1000 may include, but is not limited to, the following steps.

At a step 1010, the pole carrying device 100 is provided and placed at rest with the kickstand 132 in contact with ground, such as shown in FIG. 9A.

At a step 1015, the user (e.g., user 150) or users place the pole 105 on the pole carrying device 100 and then secure the pole 105, such as shown in FIG. 9B. More specifically, the pole 105 is placed in the cradles 116A, 116B such that the center of gravity of the pole 105 is substantially over the wheels 114 and shifted slightly toward the kickstand 132. Then, the pole 105 is secured using, for example, at least one fastening mechanism 138, which may be a strap. In this step, the pole carrying device 100 is not limited to carrying one pole 105 only. More than one pole 105 may be placed in the cradles 116A, 116B, depending on the diameter of the poles 105.

At a step 1020, the user (e.g., user 150) grasps at least one end of the pole 105 and then the pole 105 and the pole carrying device 100 are tilted toward the horizontal so that the kickstand 132 is no longer in contact with ground, thereby rendering the pole carrying device 100 to be freewheeling, such as shown in FIG. 9C. In another example, there are two users manipulating the pole carrying device 100, one at each end of the pole 105 or both at one end of the pole 105.

At a step 1025, the user (e.g., user 150) or users push or pull the pole 105 on the pole carrying device 100 by hand, thereby causing the pole carrying device 100 to wheel freely along the ground, again as shown in FIG. 9C, and thereby transporting the pole 105.

At a step 1030, once arrived at the desired destination, the pole carrying device 100 is placed at rest with the kickstand 132 in contact with ground, such as shown in FIG. 9B.

At a step 1035, the user (e.g., user 150) or users loosen or remove the mechanisms that are securing the pole 105 to the pole carrying device 100. For example, the at least one fastening mechanism 138, which may be a strap, is loosen or removed from around the pole 105.

At a step 1040, the user (e.g., user 150) or users remove the pole 105 from the pole carrying device 100.

The pole carrying device 100 is not limited to including two wheels only. The pole carrying device 100 can comprise a plurality of wheels, such as 2, 3, 4, 5, or 6 wheels. For example, FIG. 11 shows a perspective view of another example of the presently disclosed pole carrying device 100, wherein the pole carrying device 100 includes a third wheel in place of the kickstand 132. Namely, the kickstand 132 is replaced with a swivel wheel 140 that is mechanically coupled to the main beam 110 via a support 142. In this example, the pole carrying device 100 can be operated with the swivel wheel 140 in contact with and rolling along the ground or the pole carrying device 100 can be tilted during operation such that the swivel wheel 140 is not in contact with the ground. However, when at rest, the swivel wheel 140 serves the same purpose as the kickstand 132. The swivel wheel 140 can be any size and can comprise any type of swivel wheel design as long as the swivel wheel 140 supports ease of use (e.g., easy rolling and turning) with respect to the expected load and environment in which the pole carrying device 100 is used. The swivel wheel 140 can include, for example, an inflatable tire and a locking mechanism to prevent rolling when at rest.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A device for carrying and maneuvering poles or pipes, the device comprising:
   (a) a main beam operably associated with at least two wheels;
   (b) a cradle on each end of the main beam;
   (c) one or more fastening mechanisms to secure one or more poles or pipes to the main beam; and
   (d) at least one kickstand operably associated with the main beam;
   wherein the main beam is operably associated with the at least two wheels via a wheel assembly, the wheel assembly comprising two vertical members, two angled members, two axles, a first cross bar, and a second crossbar, and;
   further wherein the two wheels are rotatably coupled to the two vertical members via the two axles, the two vertical members are mechanically coupled to the two angled members, the two angled members are mechanically coupled to the main beam, the first crossbar spans between the two vertical members, and the second crossbar spans between the two angled members.

2. The device of claim 1, wherein the cradle on each end of the main beam has a protective covering.

3. The device of claim 1, wherein the device comprises one or more additional cradles disposed along the length of the main beam.

4. The device of claim 1, wherein the cradle on each end of the main beam is adjustable to accommodate the one or more poles.

5. The device of claim 1, wherein the one or more fastening mechanisms is a strap.

6. The device of claim 1, wherein the one or more fastening mechanisms is provided at each cradle.

7. The device of claim 1, wherein the at least one kickstand is removable.

8. The device of claim 1, wherein the at least one kickstand is foldable and configured to be secured to the device in a folded position.

9. The device of claim 1, wherein the at least two wheels are inflatable tires.

10. The device of claim 1, wherein the device comprises three or more wheels.

11. The device of claim 1, wherein the at least one kickstand comprises a third wheel.

12. The device of claim 11, wherein the third wheel is a swivel wheel.

13. The device of claim 1, wherein the main beam ranges from about six (6) feet to about twelve (12) feet in length.

14. The device of claim 13, wherein the main beam is approximately nine (9) feet in length.

15. The device of claim 1, wherein the at least two wheels are approximately 36 inches from the main beam and approximately 20 inches from a lateral center of the device.

16. A method of carrying or maneuvering a pole using a pole carrying device, the method comprising:
(a) providing a pole carrying device comprising a main beam operably associated with at least two wheels; a cradle on each end of the main beam; one or more fastening mechanisms to secure one or more poles to the main beam; and at least one kickstand operably associated with the main beam; wherein the main beam is operably associated with the at least two wheels via a wheel assembly, the wheel assembly comprising two vertical members, two angled members, two axles, a first cross bar, and a second crossbar, and further wherein the two wheels are rotatably coupled to the two vertical members via the two axles, the two vertical members are mechanically coupled to the two angled members, the two angled members are mechanically coupled to the main beam, the first crossbar spans between the two vertical members, and the second crossbar spans between the two angled members;
(b) placing the device at rest with the kickstand in contact with the ground;
(c) placing one or more poles on the pole carrying device and securing the pole to the device with one or more fastening mechanisms;
(d) grasping at least one end of the one or more poles and tilting the one or more poles and pole carrying device such that the kickstand is no longer in contact with the ground, thereby rendering the pole carrying device free to move;
(e) pushing or pulling the one or more poles on the pole carrying device thereby causing the pole carrying device to move along the ground;
(f) maneuvering the one or more poles and pole carrying device to a desired destination and, upon arrival, placing the pole carrying device at rest with kickstand in contact with the ground;
(g) loosening or removing the one or more fastening mechanisms; and
(h) removing the one or more poles from the pole carrying device.

17. The method of claim 16, wherein rather than one or more poles, the device transports one or more pipes, canisters, or other type of elongated cylindrical or rectangular objects.

18. The method of claim 16, wherein before pushing or pulling the one or more poles, the kickstand is either removed from the pole carrying device or folded and secured to the pole carrying device.

19. The method of claim 16, wherein the cradles of the pole carrying device have a protective covering.

* * * * *